United States Patent
Jeong et al.

(10) Patent No.: US 12,424,705 B2
(45) Date of Patent: Sep. 23, 2025

(54) SEPARATOR FOR LITHIUM SECONDARY BATTERY, METHOD FOR MANUFACTURING SAME, AND LITHIUM SECONDARY BATTERY COMPRISING SAME

(71) Applicant: LG ENERGY SOLUTION, LTD., Seoul (KR)

(72) Inventors: So-Mi Jeong, Daejeon (KR); Min-Ji Kim, Daejeon (KR); Da-Kyung Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 537 days.

(21) Appl. No.: 17/908,394

(22) PCT Filed: Mar. 31, 2021

(86) PCT No.: PCT/KR2021/004015
§ 371 (c)(1),
(2) Date: Aug. 31, 2022

(87) PCT Pub. No.: WO2021/201607
PCT Pub. Date: Oct. 7, 2021

(65) Prior Publication Data
US 2023/0098650 A1  Mar. 30, 2023

(30) Foreign Application Priority Data
Apr. 3, 2020  (KR) .................. 10-2020-0041003

(51) Int. Cl.
*H01M 50/449* (2021.01)
*H01M 10/052* (2010.01)
*H01M 10/42* (2006.01)
*H01M 50/403* (2021.01)
*H01M 50/417* (2021.01)

(52) U.S. Cl.
CPC ....... *H01M 50/449* (2021.01); *H01M 10/052* (2013.01); *H01M 10/4235* (2013.01); *H01M 50/403* (2021.01); *H01M 50/417* (2021.01); *H01M 2200/00* (2013.01)

(58) Field of Classification Search
None
See application file for complete search history.

(56) References Cited

U.S. PATENT DOCUMENTS

| 4,286,030 A | * | 8/1981 | Moore | H01M 50/403 |
| | | | | 156/335 |
| 2007/0036959 A1 | | 2/2007 | Yamato et al. | |
| 2013/0029202 A1 | | 1/2013 | Son et al. | |
| 2013/0216891 A1 | | 8/2013 | Byun et al. | |
| 2014/0045096 A1 | * | 2/2014 | Berger | H01M 8/1065 |
| | | | | 204/279 |
| 2014/0255752 A1 | | 9/2014 | Miller et al. | |
| 2015/0325829 A1 | | 11/2015 | Lee | |
| 2017/0133654 A1 | * | 5/2017 | Cho | C09D 179/08 |
| 2018/0083259 A1 | | 3/2018 | Ho et al. | |
| 2020/0343511 A1 | * | 10/2020 | Nagao | H01M 50/454 |

FOREIGN PATENT DOCUMENTS

| CN | 108493389 A | 9/2018 |
| CN | 109167007 A | 1/2019 |
| JP | 2010-232202 A | 10/2010 |
| JP | 2015-215987 A | 12/2015 |
| JP | 5915806 B2 | 5/2016 |
| JP | 2019-220281 A | 12/2019 |
| KR | 10-2011-0129203 A | 12/2011 |
| KR | 10-1262880 B1 | 5/2013 |
| KR | 10-1267283 B1 | 5/2013 |
| KR | 10-2013-0096138 A | 8/2013 |
| KR | 10-2015-0126903 A | 11/2015 |
| KR | 10-2016-0092862 A | 8/2016 |
| KR | 10-2017-0053495 A | 5/2017 |
| KR | 10-1792681 B1 | 11/2017 |
| KR | 10-1958644 B1 | 3/2019 |
| KR | 10-2019-0039836 A | 4/2019 |
| WO | WO 2019/176290 A1 | 9/2019 |

OTHER PUBLICATIONS

International Search Report for PCT/KR2021/004015 mailed on Jul. 19, 2021.
Extended European Search Report for European Application No. 21780053.1, dated Oct. 25, 2024.
Machine translation of CN 109167007 A, published on Jan. 8, 2019.

* cited by examiner

*Primary Examiner* — Alix E Eggerding
(74) *Attorney, Agent, or Firm* — Birch, Stewart, Kolasch & Birch, LLP

(57) ABSTRACT

A separator for a lithium secondary battery, a method for manufacturing the same and a lithium secondary battery comprising the same, where the separator includes a porous polymer substrate having a plurality of pores and a polymer coating layer on at least one surface of the porous polymer substrate. The polymer coating layer comprises a thermosetting phenol-containing resin having at least one hydroxyl group and at least one aromatic ring. A coating amount of the thermosetting phenol-containing resin is 0.01 g/m² to 3 g/m² of the porous polymer substrate based on one polymer coating layer.

11 Claims, No Drawings

SEPARATOR FOR LITHIUM SECONDARY BATTERY, METHOD FOR MANUFACTURING SAME, AND LITHIUM SECONDARY BATTERY COMPRISING SAME

TECHNICAL FIELD

The present disclosure relates to a separator for a lithium secondary battery, a method for manufacturing the same and a lithium secondary battery comprising the same.

The present application claims priority to Korean Patent Application No. 10-2020-0041003 filed in the Republic of Korea on Apr. 3, 2020, the disclosure of which is incorporated herein by reference.

BACKGROUND ART

Recently, there has been an increasing interest in energy storage technology. As the application field of energy storage technology has been extended to mobile phones, camcorders, laptop computers, and even electric cars, many efforts have been devoted to studying and developing electrochemical devices. In this aspect, electrochemical devices are attracting more attention, and especially, development of rechargeable secondary batteries is the focus of attention, and more recently, in the development of batteries, new electrode and battery design for improving the capacity density and specific energy have been studied and developed.

In currently available secondary batteries, lithium secondary batteries developed in early 1990's have much higher operating voltage and energy density than traditional batteries using aqueous electrolyte solutions such as Ni-MH, Ni—Cd, lead-acid batteries, and by virtue of these advantages, lithium secondary batteries are gaining much attention.

Electrochemical devices including lithium secondary batteries are produced by many manufacturers, and each shows different safety characteristics. Assessment and management of the safety of electrochemical devices is very grave. The most important consideration is that electrochemical devices should not cause injury to users in the event of malfunction, and for this purpose, Safety Regulations strictly prohibit ignition and flame in electrochemical devices. In the safety characteristics of electrochemical devices, overheating and eventual thermal runaway in electrochemical devices or piercing of separators poses a high risk of explosion.

The separator prevents a short circuit between a positive electrode and a negative electrode, and provides a movement channel of a lithium ion. Accordingly, the separator is an important factor that affects the safety and output characteristics of the battery. However, a polyolefin-based porous polymer substrate commonly used as the separator of the electrochemical device exhibits extremely severe heat shrink behaviors at 130° C. or above due to the material characteristics and the procedural characteristics of the manufacturing process comprising stretching, causing a short circuit between the positive electrode and the negative electrode.

To improve the heat resistance, attempts have been made to form a porous coating layer comprising inorganic particles and a thermoplastic binder polymer on the porous polymer substrate. When the porous coating layer is formed, the heat resistant property may be improved compared to the porous polymer substrate used alone. However, when exposed to a high temperature environment than the melting point of the binder polymer, there are limitations to the improvement of thermal safety. Additionally, the porous coating layer comprising the inorganic particles increases the thickness of the separator, resulting in decreased energy density and increased resistance.

Meanwhile, when the polymer coated on the porous polymer substrate is swollen or dissolved by the electrolyte solution, the adhesive strength of the coating layer to the polymer substrate reduces, which degrades the function of suppressing the thermal contraction of the separator.

DISCLOSURE

Technical Problem

The present disclosure is directed to providing a separator with improved heat resistance without using inorganic particles and suppressed thermal shrinkage when soaked in an electrolyte solution.

The present disclosure is further directed to providing a method for manufacturing the separator for a lithium secondary battery having the above-described features.

The present disclosure is further directed to providing a lithium secondary battery comprising the separator having the above-described features.

Technical Solution

An aspect of the present disclosure provides a separator for a lithium secondary battery according to the following embodiments.

A first embodiment relates to a separator for a lithium secondary battery comprising a porous polymer substrate having a plurality of pores and a polymer coating layer on at least one surface of the porous polymer substrate, wherein the polymer coating layer comprises a thermosetting phenol-containing resin having at least one hydroxyl group and at least one aromatic ring, and a coating amount of the thermosetting phenol-containing resin is 0.01 g/m² to 3 g/m² of the porous polymer substrate based on one polymer coating layer.

A second embodiment relates to the separator for a lithium secondary battery according to the first embodiment wherein the phenol-containing binder polymer comprises at least one of a novolac-containing phenol resin represented by the following Formula 1 or a resol-containing phenol resin represented by the following Formula 2:

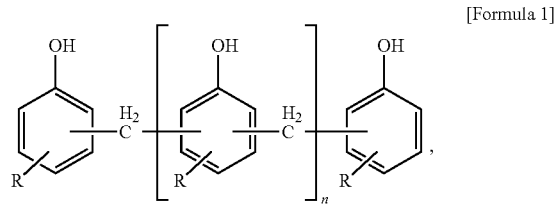

[Formula 1]

in the Formula 1, n is an integer of 1 or greater, and R is any one of H, alkyl, alkoxy and alkenyl group having 1 to 100 carbon atoms, wherein the alkyl, alkoxy and alkenyl group having 1 to 100 carbon atoms are optionally substituted,

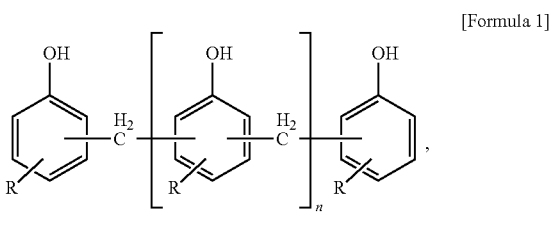

[Formula 1]

in the Formula 1, n is an integer of 1 or greater, and R is any one of H, alkyl, alkoxy and alkenyl group having 1 to 100 carbon atoms, wherein the alkyl, alkoxy and alkenyl group having 1 to 100 carbon atoms are optionally substituted,

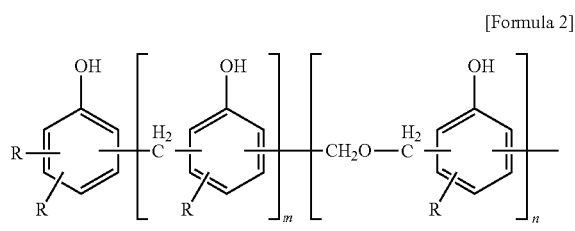

[Formula 2]

in the Formula 2, each of n and m is an integer of 1 or greater, and R is any one of H, alkyl, alkoxy and alkenyl group having 1 to 100 carbon atoms, wherein the alkyl, alkoxy and alkenyl group having 1 to 100 carbon atoms are optionally substituted.

A third embodiment relates to the separator for a lithium secondary battery according to the first or second embodiment wherein the thermosetting phenol-containing resin is thermoset at 120° C. to 200° C.

A fourth embodiment relates to the separator for a lithium secondary battery according to any one of the first to third embodiments wherein the thermosetting phenol-containing resin is a phenol-formaldehyde resin.

A fifth embodiment relates to the separator for a lithium secondary battery according to any one of the first to fourth embodiments wherein the coating amount of the thermosetting phenol-containing resin is specifically 0.05 g/m$^2$ to 2.5 g/m$^2$ of the porous polymer substrate based on one polymer coating layer, and more specifically, the coating amount of the thermosetting phenol-containing resin is 0.35 g/m$^2$ to 2.1 g/m$^2$ of the porous polymer substrate based on one polymer coating layer.

A sixth embodiment relates to the separator for a lithium secondary battery according to any one of the first to fifth embodiments wherein the porous polymer substrate comprises a porous polymer film includes at least one of polyethylene or polypropylene.

Another aspect of the present disclosure provides a method for manufacturing a separator according to the following embodiments.

A seventh embodiment relates to a method for manufacturing a separator for a lithium secondary battery comprising (S1) preparing a polymer solution in which a thermosetting phenol-containing resin having at least one hydroxyl group and at least one aromatic ring is dissolved in a solvent, and (S2) coating the polymer solution on at least one surface of a porous polymer substrate such that a coating amount of the thermosetting ph phenol-containing resin is 0.01 g/m$^2$ to 3 g/m$^2$ of the porous polymer substrate based on one polymer coating layer and drying the coated polymer solution to form a polymer coating layer.

An eighth embodiment relates to the method for manufacturing a separator for a lithium secondary battery according to the seventh embodiment wherein the phenol-containing binder polymer comprises at least one of a novolac-containing phenol resin represented by the following Formula 1 or a resol-containing phenol resin represented by the following Formula 2:

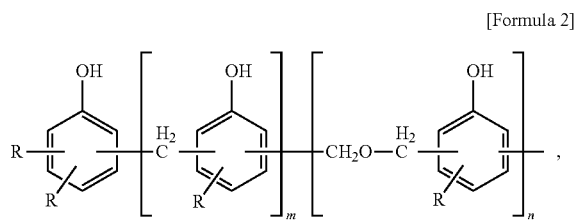

[Formula 2]

in the Formula 2, each of n and m is an integer of 1 or greater, and R is any one of H, alkyl, alkoxy and alkenyl group having 1 to 100 carbon atoms, wherein the alkyl, alkoxy and alkenyl group having 1 to 100 carbon atoms are optionally substituted.

A ninth embodiment relates to the method for manufacturing a separator for a lithium secondary battery according to the seventh or eighth embodiment wherein the thermosetting phenol-containing resin is thermoset at 120° C. to 200° C.

A tenth embodiment relates to the method for manufacturing a separator for a lithium secondary battery according to any one of the seventh to ninth embodiments wherein the coating amount of the thermosetting phenol-containing resin is specifically 0.05 g/m$^2$ to 2.5 g/m$^2$ of the porous polymer substrate based on one polymer coating layer, and more specifically, the coating amount of the thermosetting phenol-containing resin is 0.35 g/m$^2$ to 2.1 g/m$^2$ of the porous polymer substrate based on one polymer coating layer.

Still another embodiment of the present disclosure provides a lithium secondary battery comprising a positive electrode, a negative electrode and a separator interposed between the positive electrode and the negative electrode, wherein the separator is defined in any one of the preceding embodiments.

Advantageous Effects

According to an embodiment of the present disclosure, the polymer coating layer comprising the thermosetting phenol-based resin having at least one hydroxyl group and an aromatic ring is formed on at least one surface of the porous polymer substrate, and the coating amount of the thermosetting phenol-based resin is controlled to 0.01 g to 3 g per 1 m$^2$ of the porous polymer substrate on the basis of one surface coated.

When the electrochemical device comprising the separator is exposed to high temperature due to ignition or the like, the thermosetting phenol-based resin is thermoset to form a network structure. Accordingly, it is possible to provide a separator with the enhanced heat resistant property and improved thermal safety without using inorganic particles.

Additionally, in the separator of the present disclosure having the above-described features, the polymer coating layer is less swollen or dissolved by the electrolyte solution when soaked in the electrolyte solution, thereby suppressing the thermal contraction of the separator.

DETAILED DESCRIPTION

Hereinafter, the embodiments of the present disclosure will be described. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the configuration described in the embodiments disclosed in the specification is the most preferred embodiment of the present disclosure, and does not fully describe the technical aspect of the present disclosure, so it should be understood that a variety of other equivalents and modifications could have been made thereto at the time of filing the patent application.

The term comprises when used in this specification, specifies the presence of stated elements, but does not preclude the presence or addition of one or more other elements, unless the context clearly indicates otherwise.

In general, a lithium secondary battery uses a porous polymer substrate for a separator. The porous polymer substrate may include a nonwoven fabric substrate made of polymer fibers and a film substrate formed by melting and extruding a polymer, and among the polymer substrates, especially, the film substrate shows heat shrink behaviors. Accordingly, to improve the heat resistant property of the separator, a porous coating layer comprising inorganic particles and a binder polymer on at least one surface of the porous polymer substrate is introduced. When the porous coating layer is formed, it is possible to improve the heat resistant property of the separator compared to the porous polymer substrate used alone.

A thermoplastic fluorine-based binder polymer is primarily used for the binder polymer, and there are limitations to the improvement of thermal safety when exposed to a higher temperature environment than the melting point of the binder polymer. Additionally, when the porous coating layer comprising the inorganic particles is introduced as described above, the thickness of the separator increases, resulting in decreased energy density and increased resistance. Meanwhile, when the polymer coated on the porous polymer substrate is swollen or dissolved by an electrolyte solution, the adhesive strength of the coating layer to the polymer substrate reduces, which notably degrades the function of suppressing the thermal contraction of the separator.

To address this issue, the inventors aim at providing a separator with improved heat resistance of a porous coating layer when an electrochemical device comprising the separator is exposed to high temperature due to ignition or the like, and which is less swollen or dissolved by an electrolyte solution when soaked in the electrolyte solution, thereby suppressing the thermal contraction of the separator.

To solve the above-described problem, a separator for a lithium secondary battery according to an aspect of the present disclosure comprises:

a porous polymer substrate having a plurality of pores and a polymer coating layer formed on at least one surface of the porous polymer substrate, wherein the polymer coating layer comprises a thermosetting phenol-based resin having at least one hydroxyl group and an aromatic ring, and a coating amount of the thermosetting phenol-based resin is 0.01 g to 3 g per 1 $m^2$ of the porous polymer substrate on the basis of one surface coated.

In the separator according to an aspect of the present disclosure, when the separator is exposed to an abnormal environment such as high temperature, the thermosetting phenol-based resin of the polymer coating layer is thermoset to form a network structure. In this instance, the network structure refers to a structure formed by the thermosetting reaction of the thermosetting phenol-based resin, and the network structure may be a 3-dimensional network structure.

When the thermosetting phenol-based resin of the polymer coating layer form a network structure by the thermosetting reaction in an abnormal environment such as high temperature, the heat resistance is better than when a thermoplastic polymer is used, and safety may be improved. That is, when the network structure is formed by the thermosetting reaction, it is possible to keep the polymer coating layer robust up to very high temperature.

That is, according to the present disclosure, it is possible to provide a separator with improved heat resistance without a porous coating layer comprising inorganic particles. Additionally, since it is not a porous coating layer comprising inorganic particles, it can be formed with a small thickness, thereby providing a battery with high energy density for the same capacity. Additionally, the thermosetting phenol-based resin is less swollen or dissolved by the electrolyte solution used in the lithium secondary battery and does not have a significant reduction in the adhesive strength of the polymer coating layer to the porous polymer substrate after soaked in the electrolyte solution, thereby preventing the degradation in the function of suppressing the thermal contraction of the separator after soaked in the electrolyte solution.

[Polymer Coating Layer Comprising Thermosetting Phenol-Based Resin]

The polymer coating layer comprises a thermosetting phenol-based resin.

In the specification, the polymer coating layer refers to a coating layer comprising polymer as the main component, with no inorganic particles. Of course, the polymer coating layer may comprise other components except inorganic particles without departing from the present disclosure.

The thermosetting phenol-based resin has at least one hydroxyl group and an aromatic ring.

The thermosetting phenol-based resin form a network structure by a curing reaction by heat at high temperature. Specifically, the thermosetting phenol-based resin may be thermoset by thermosetting reaction at high temperature of, for example, 120° C. or above, or more specifically, 120 to 200° C.

The thermosetting phenol-based resin may comprise at least one of novolac-type phenol resin represented by the following Formula 1 or resole-type phenol resin represented by the following Formula 2, and may further comprise a modified phenol resin. Specifically, any thermosetting phenol-based resin obtained by aldehyde condensation reaction of phenol and its derivative is available.

In this instance, the above Formula 1 may be represented as follows:

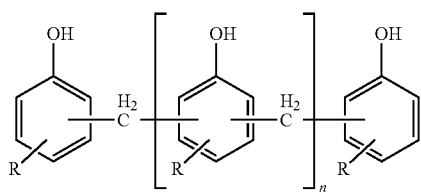

[Formula 1]

In the above Formula 1, n is an integer of 1 or greater, and R may be any one of H and optionally substituted alkyl, alkoxy and alkenyl group having 1 to 100 carbon atoms. In this instance, the number of carbon atoms may be 1 to 100, 1 to 50, 1 to 30, or 1 to 10.

In the present disclosure, the "novolac-type phenol resin" may be obtained by reaction between a phenol compound and an aldehyde compound in the presence of an acidic catalyst. The novolac-type phenol resin has a phenolic hydroxyl group and is soluble in alkali, but the solubility decreases with the increasing molecular weight.

Since the novolac-type resin has almost no methylol group acting on the curing reaction, the novolac-type resin may form a cured product of 3D structure when heated with an addition of a curing agent such as hexamethylenetetramine ($(CH_2)_6N_4$).

The novolac-type phenol resin may be present in ortho- or para-linkage. In a particular embodiment of the present disclosure, the novolac-type phenol resin may have the ortho-to-para ratio of less than 0.2, and more specifically, less than 0.1.

In a particular embodiment of the present disclosure, the novolac-type phenol resin may comprise at least two types of novolac-type phenol resins having different ortho-to-para ratios. In this instance, when a high-para novolac-type phenol resin having more para linkages than ortho linkages is used, curing occurs more rapidly at high temperature, thereby improving the safety of the separator.

The novolac-type phenol resin preferably has the weight average molecular weight (Mw) of 1000 to 4000 and the polydispersity index (Mw/Mn, Mn is the number average molecular weight) of 2.0 or less. When the weight average molecular weight of the novolac-type phenol resin has the above-described range, it is more advantageous for heat resistance and flowability in the slurry preparation and formation of a thin porous coating layer. The novolac-type phenol resin may have the hydroxyl group equivalent of 100 to 200 g/eq.

The above Formula 2 may have the following structure:

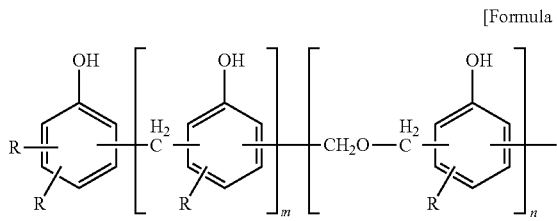

[Formula 2]

In the above Formula 2, each of n and m is an integer of 1 or greater, and R may be any one of H and optionally substituted alkyl, alkoxy and alkenyl group having 1 to 100 carbon atoms.

In the present disclosure, the "resole-type phenol resin" may be obtained by reaction between a phenol compound and an aldehyde compound in the presence of a metal catalyst. The resole-type phenol resin has a hydroxyl group, and may form a crosslinked structure by reaction with the novolac-type phenol resin.

In this instance, the metal catalyst may comprise manganese, magnesium and zinc. Specifically, the metal catalyst may be metal acetate. For example, the metal catalyst may comprise manganese acetate, magnesium acetate and zinc acetate. These may be used alone or in combination.

The resole-type phenol resin preferably has the weight average molecular weight (Mw) of 420 to 1,500 and the polydispersity index (Mw/Mn, Mn is the number average molecular weight) of 2.0 or less. When the weight average molecular weight of the resole-type phenol resin has the above-described range, it is more advantageous for heat resistance and flowability in the slurry preparation and formation of a thin porous coating layer. The resole-type phenol resin may have the hydroxyl group equivalent of 100 to 200 g/eq.

In this instance, the weight average molecular weight may be measured using gel permeation chromatography (GPC) (PL GPC220, Agilent Technologies).

Specifically, the weight average molecular weight may be measured under the following analysis conditions:

Column: PL MiniMixed B×2

Solvent: THF or DMF

Flow rate: 0.3 ml/min

Specimen concentration: 2.0 mg/ml

Injection amount: 10 μℓ

Column temperature: 40° C.

Detector: Agilent RI detector

Standard: Polystyrene (fitted to a third degree polynominal)

Data processing: ChemStation

In a particular embodiment of the present disclosure, the thermosetting phenol-based resin may be 2,3,4-trihydroxybenzophenone, 2,4,6-trihydroxybenzophenone, 2,2'-tetrahydroxybenzophenone, 4,4'-tetrahydroxybenzophenone, 2,3,4,3'-tetrahydroxybenzophenone, 2,3,4,4'-tetrahydroxybenzophenone, 2,3,4,2'-tetrahydroxy 4'-methylbenzophenone, 2,3,4,4'-tetrahydroxy 3'-methoxybenzophenone, 2,3,4,2'-pentahydroxybenzophenone, 2,3,4,6'-pentahydroxybenzophenone, 2,4,6,3'-hexahydroxybenzophenone, 2,4,6,4'-hexahydroxybenzophenone, 2,4,6,5'-hexahydroxybenzophenone, 3,4,5,3'-hexahydroxybenzophenone, 3,4,5,4'-hexahydroxybenzophenone, 3,4,5,5'-hexahydroxybenzophenone, bis(2,4-dihydroxyphenyl) methane, bis(p-hydroxyphenyl) methane, tri(p-hydroxyphenyl) methane, 1,1,1-tri(p-hydroxyphenyl) ethane, bis(2,3,4-trihydroxyphenyl) methane, 2,2-bis(2,3,4-trihydroxyphenyl) propane, 1,1,3-tris(2,5-dimethyl 4-hydroxyphenyl)-3-phenylpropane, 4,4'-[1-[4-[1-[4-hydroxyphenyl]-1-methylethyl]phenyl]ethylidene]bisphenol, or bis(2,5-dimethyl 4-hydroxyphenyl)-2-hydroxyphenylmethane, and may be manufactured using the above compounds alone or in combination. For example, the thermosetting phenol-based resin may be a phenol-formaldehyde resin.

In a particular embodiment of the present disclosure, the thermosetting phenol-based resin may form a network structure of the following structure when thermoset in an abnormal high temperature environment.

For example, the network structure may be represented by the following Formula 3:

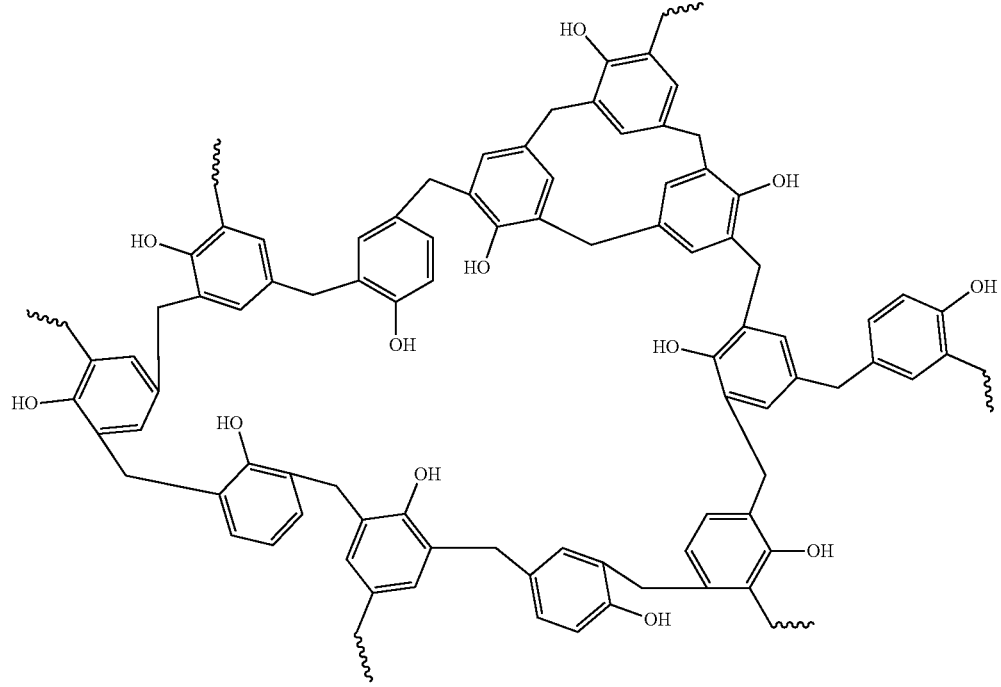

[Formula 3]

In this instance, the coating amount of the thermosetting phenol-based resin is 0.01 g to 3 g per 1 m² of the porous polymer substrate on the basis of one surface coated. Specifically, the loading amount of the thermosetting phenol-based resin may be 0.05 g to 2.5 g per 1 m² of the porous polymer substrate, and more specifically, the loading amount of the thermosetting phenol-based resin may be 0.35 g to 2.1 g per 1 m² of the porous polymer substrate.

Within the above-described range, the thermosetting phenol-based resin is coated on the pore walls of the porous polymer substrate, thereby improving the heat resistance of the separator. When the amount of the thermosetting phenol-based resin is less than 0.01 g, it is impossible to achieve the desired thermal shrinkage. When the amount of the thermosetting phenol-based resin is larger than 3 g, the porosity reduces and the air permeation time increases too much.

The polymer coating layer of the present disclosure may comprise, as the polymer, the above-described thermosetting phenol-based resin alone or any other thermosetting resin or a thermoplastic resin without departing from the scope of the present disclosure.

[Porous Polymer Substrate]

In the separator according to an aspect of the present disclosure, the porous polymer substrate may be, specifically, a porous polymer film substrate or a porous polymer nonwoven substrate.

In the separator according to an aspect of the present disclosure, the porous polymer substrate may be, specifically, a porous polymer film substrate or a porous polymer nonwoven substrate.

The porous polymer film substrate may be a porous polymer film made of polyolefin such as polyethylene and polypropylene, and the polyolefin porous polymer film substrate exerts a shut-down function, for example, at 80 to 150° C.

In this instance, the polyolefin porous polymer film may be formed from polyolefin-based polymer including polyethylene such as high density polyethylene, linear low density polyethylene, low density polyethylene, ultrahigh molecular weight polyethylene, polypropylene, polybutylene, polypentene, alone or in combination.

Additionally, in addition to the polyolefin, the porous polymer film substrate may be manufactured by forming various types of polymers, for example, polyester, into a film shape. Additionally, the porous polymer film substrate may be formed with a stack structure of two or more film layers, and each film layer may be formed from polymer such as polyolefin and polyester described above alone or in combination. Preferably, the porous polymer substrate may comprise a porous polymer film made of at least one of polyethylene or polypropylene.

Additionally, in addition to the above-described polyolefins, the porous polymer film substrate and the porous nonwoven substrate may be made of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene, alone or in combination.

There is no particular limitation on the thickness of the porous polymer substrate, but the thickness of the porous polymer substrate is preferably 1 to 20 μm, and more specifically, 5 to 15 μm, and there is no particular limitation on the pore size and porosity in the porous polymer substrate, but the pore size is preferably 0.01 to 50 μm and the porosity is preferably 20 to 75%.

A method for manufacturing the separator according to an aspect of the present disclosure is as follows. However, the method is not limited thereto.

First, a polymer solution is prepared in which a thermosetting phenol-based resin having at least one hydroxyl group and an aromatic ring is dissolved in a solvent (S1). In this instance, the solvent preferably has a similar solubility index to the thermosetting phenol-based resin and a low boiling point. This is to ease the homogenous mixing and subsequent solvent removal. Non-limiting example of available solvents may include at least one selected from alcohol, acetone, tetrahydrofuran, methylenechloride, chloroform, dimethylformamide, N-methyl-2-pyrrolidone, methylethylketone and cyclohexane having 2 to 5 carbon atoms.

In this instance, the solids in the binder polymer solution are preferably present in an amount of 7% or less.

Subsequently, the polymer solution is coated on at least one surface of the porous polymer substrate such that the coating amount of the thermosetting phenol-based resin is 0.01 g to 3 g per 1 m$^2$ of the porous polymer substrate and dried to form a polymer coating layer (S2).

There is no particular limitation on the method for coating the polymer solution on the porous polymer substrate, but it is preferred to use a slot coating method or a dip coating method. The slot coating may adjust the coating amount of the polymer coating layer according to the flow rate supplied from a constant volume pump in a manner of coating a composition supplied through a slot die over the surface of a substrate. Additionally, the dip coating is a coating method including dipping a substrate in a tank containing a slurry, and may control the coating amount of the polymer coating layer according to the concentration of the composition and the speed at which the substrate is taken out of the composition tank, and for more accurate control of the coating amount, after dipping, measurement may be performed through a Meyer bar.

The porous polymer substrate coated with the polymer solution is dried using a dryer such as an oven to form the polymer coating layer on at least one surface of the porous polymer substrate.

A lithium secondary battery according to an aspect of the present disclosure comprises a positive electrode, a negative electrode and a separator interposed between the positive electrode and the negative electrode, and the separator is the above-described separator according to an embodiment the present disclosure.

The lithium secondary battery may include a lithium metal secondary battery, a lithium ion secondary battery, a lithium polymer secondary battery or a lithium ion polymer secondary battery.

There is no particular limitation on the positive electrode and the negative electrode that will be used with the separator of the present disclosure, and the two electrodes may be manufactured by binding an electrode active material and an electrode current collector used in the lithium secondary battery by the methods commonly used in the art. Of the electrode active material, non-limiting examples of the positive electrode active material include positive electrode active materials commonly used in the positive electrode of the lithium secondary battery, and in particular, it is preferred to use lithium manganese oxide, lithium cobalt oxide, lithium nickel oxide, lithium iron oxide or their lithium composite oxide. Non-limiting examples of the negative electrode active material includes negative electrode active materials commonly used in the negative electrode of the lithium secondary battery, and especially preferably, lithium adsorption materials such as lithium metal or lithium alloys, carbon, petroleum coke, activated carbon, graphite or other carbons. Non-limiting example of the positive electrode current collector include foils made of aluminum, nickel or a combination thereof, and non-limiting examples of the negative electrode current collector include foils made of copper, gold, nickel or copper alloys or a combination thereof.

An electrolyte solution which may be used in the lithium secondary battery of the present disclosure comprises a salt dissolved or dissociated in an organic solvent, the salt having a structure represented as A$^+$B$^-$, wherein A$^+$ is an alkali metal cation such as Lit, Na$^+$, K$^+$ or a combination thereof, and B$^-$ is an anion such as $\mu F_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the organic solvent comprising at least one of propylene carbonate (PC), ethylene carbonate (EC), diethylcarbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethylmethylcarbonate (EMC) or γ-butyrolactone, but is not limited thereto.

The pouring of the electrolyte solution may be performed in any suitable step of the battery manufacturing process according to the manufacturing process and required properties of a final product. That is, the pouring of the electrolyte solution may be applied before battery assembly or in the final step of battery assembly.

Hereinafter, the present disclosure will be described in detail through embodiments/examples. However, the embodiments/examples of the present disclosure may be modified in many other forms, and the scope of the present disclosure should not be construed as being limited to the following embodiments/examples. The embodiments/examples of the present disclosure are provided to fully explain the present disclosure to those having ordinary knowledge in the art to which the present disclosure pertains.

Examples 1 to 3

A thermosetting phenol-based resin (Gangnam Hwasung, resole-type phenol resin, thermosetting temperature: about 150° C., acetone soluble, solids 50%, viscosity 250 mPas at 25° C.) is added to an acetone solvent in an amount shown in Table 1 and stirred at 23° C. for 30 minutes to prepare a binder polymer solution.

The prepared binder polymer solution is coated on two surfaces of a porous polymer substrate (polypropylene, thickness 16 μm, porosity 46%) by dip coating at 23° C. and relative humidity of 30% and then dried. Accordingly, a separator having the phenol-based binder polymer coated on the two surfaces of the porous polymer substrate is manufactured.

Comparative Example 1

A porous polymer substrate (polypropylene, thickness 16 μm, porosity 46%) is used as the separator.

Comparative Example 2

Instead of the thermosetting phenol-based resin, polyvinylidene fluoride-co-hexafluoropropylene (HFP substitution ratio: 8 weight %, weight average molecular weight 500,000) is added to an acetone solvent in an amount shown in Table 1 and stirred at 50° C. for 4 hours to prepare a 5 weight % binder polymer solution.

The prepared binder polymer solution is coated on two surfaces of a porous polymer substrate (polypropylene, thickness 16 μm, porosity 46%) by dip coating at 23° C. and relative humidity of 40% and then dried. Accordingly, a separator having the PVDF-HFP binder polymer coated on the two surfaces of the porous polymer substrate is manufactured.

Examples 4 to 7

A separator is manufactured by the same method as example 1 except that polyethylene (9 μm, porosity 45%) is used as the porous polymer substrate and the amount of polymer solution is controlled as shown in Table 1.

Comparative Example 3

A separator is manufactured by the same method as example 1 except that the amount of the thermosetting phenol-based resin in the coating solution is changed as shown in Table 1.

Comparative Example 4

Polyethylene (9 μm, porosity 45%) itself is used as the separator.

Comparative Example 5

A porous coating layer forming slurry is prepared by the following method. Specifically, aluminum hydroxide (Al(OH)$_3$) (particle size: 500 nm) as inorganic particles is added to a solvent, acetone, such that a percentage of solids is 30%. In this instance, the percentage of solids refers to an amount of powder left after drying out the solvent in the sum of the solvent and the raw material composition. Here, isopropyl trioleyl titanate as a dispersing agent is added and stirred for 2 hours to prepare an inorganic particle dispersion.

Subsequently, polyvinylidene fluoride-co-hexafluoropropylene (PVDF-HFP) is added to a solvent, acetone, and dissolved at 50° C. for about 4 hours, to prepare a polymer solution.

The prepared inorganic particle dispersion and the polymer solution are mixed such that a weight ratio of the inorganic particles and the binder polymer is 75:25, the inorganic particles are milled and dispersed using a ball mill method for 3 hours to prepare a porous coating layer forming slurry having the percentage of solids of 15%.

Subsequently, the porous coating layer forming slurry is coated on two surfaces of polypropylene (9 μm, porosity 45%) manufactured by a wet method, at 23° C. and relative humidity of 40% such that the total loading amount of solids in the slurry is 6.9 g/m$^2$ and dried to manufacture a separator having the porous coating layer.

Comparative Example 6

Instead of the phenol-based binder polymer, a polyvinylidene fluoride-co-hexafluoropropylene binder polymer (HFP substitution ratio: 8 weight %, weight average molecular weight 500,000) is added to an acetone solvent in an amount shown in Table 1, and stirred at 50° C. for 4 hours to prepare a 5 weight % binder polymer solution.

The prepared binder polymer solution is coated on two surfaces of a porous polymer substrate (polyethylene (9 μm, porosity 45%)) by dip coating at 23° C. and relative humidity of 40% and then dried. Accordingly, a separator having the PVDF-HFP the binder polymer coated on the two surfaces of the porous polymer substrate is manufactured.

Comparative Example 7

A separator is manufactured by the same method as example 4 except that the amount of the thermosetting phenol-based resin in the coating solution is changed as shown in Table 1.

TABLE 1

| Classification | Porous polymer film | Solids in coating solution | Solids content in coating solution | Solids coating amount (1 m$^2$ per of porous polymer substrate on the basis of one surface coated) | Air permeability (sec/100 ml) | 130° C. 30 min MD | 130° C. 30 min TD | 150° C., 30 min MD (in the case of the corresponding dry fabric, no TD contraction at 150° C.) | Thermal shrinkage of separator when soaked in electrolyte solution (%) 150° C. MD | Thermal shrinkage of separator when soaked in electrolyte solution (%) 150° C. 30 min TD |
|---|---|---|---|---|---|---|---|---|---|---|
| Comparative example 1 | Polypropylene | Coating X | — | 0 | 119 | — | — | 35 | — | — |
| Comparative example 2 | Polypropylene | PVDF-HFP | 5% | 3.4 | 260 | — | — | 24 | — | — |
| Example 1 | Polypropylene | Thermosetting phenol-based resin | 1.5% | 0.36 | 119 | — | — | 24 | — | — |
| Example 2 | Polypropylene | Thermosetting phenol-based resin | 5% | 1.32 | 163 | — | — | 16 | — | — |
| Example 3 | Polypropylene | Thermosetting phenol-based resin | 7% | 2.08 | 276 | — | — | 14 | — | — |
| Comparative example 3 | Polypropylene | Thermosetting phenol-based resin | 10% | 3.20 | 629 | — | — | 13 | — | — |
| Comparative example 4 | Polyethylene | Coating X | — | 0 | 81 | 26 | 24 | — | 65 | 54 |
| Comparative example 5 | Polyethylene | Al$_2$O$_3$/PVDF-HFP | 15% | 6.9 | 264 | 13 | 11 | — | 56 | 44 |

TABLE 1-continued

| Classification | Porous polymer film | Solids in coating solution | Solids content in coating solution | Solids coating amount (1 m² per of porous polymer substrate on the basis of one surface coated) | Air permeability (sec/100 ml) | Thermal shrinkage (%) of separator itself before soaked in electrolyte solution | | 150° C., 30 min MD (in the case of the corresponding dry fabric, no TD contraction at 150° C.) | Thermal shrinkage of separator when soaked in electrolyte solution (%) 150° C. 30 min | |
|---|---|---|---|---|---|---|---|---|---|---|
| | | | | | | 130° C. 30 min MD | TD | | | |
| Comparative example 6 | Polyethylene | PVDF-HFP | 5% | 3.3 | 209 | 18 | 14 | — | 50 | 46 |
| Example 4 | Polyethylene | Thermosetting phenol-based resin | 1.5% | 0.33 | 86 | 24 | 23 | — | 46 | 44 |
| Example 5 | Polyethylene | Thermosetting phenol-based resin | 3% | 0.89 | 101 | 23 | 21 | — | 30 | 28 |
| Example 6 | Polyethylene | Thermosetting phenol-based resin | 5% | 1.23 | 181 | 19 | 17 | — | 20 | 17 |
| Example 7 | Polyethylene | Thermosetting phenol-based resin | 7% | 2.0 | 439 | 17 | 15 | — | 18 | 16 |
| Comparative example 7 | Polyethylene | Thermosetting phenol-based resin | 10% | 3.10 | 4950 | 14 | 12 | — | 14 | 12 |

(1) Method for Measuring Thermosetting Temperature of Thermosetting Phenol-Based Resin For the thermosetting phenol-based resin, the exothermic peak temperature measured using a differential scanning calorimeter (DSC) is measured as thermosetting temperature.

(2) Method for Measuring Air Permeability

In accordance with JIS P-8117, air permeability is measured using a Gurley air permeability tester. In this instance, the time for 100 ml of air to pass through diameter of 28.6 mm and area of 645 mm' is measured.

(3) Method for Measuring Thermal Shrinkage of Separator Itself Before Soaked in Electrolyte Solution For the separators of comparative examples 1 to 3 and examples 1 to 3, the thermal shrinkage of the separator itself before soaked in the electrolyte solution is measured. The separators of comparative examples 1 to 3 and examples 1 to 3 use the polypropylene film as the porous polymer substrate, and the melting point of the polypropylene porous polymer substrate is above 150° C. Accordingly, the thermal shrinkage is calculated as (initial length−length after thermal contraction treatment at 150° C./30 min)/(initial length)×100.

Meanwhile, for the separators of comparative examples 4 to 7 and examples 4 to 7, the thermal shrinkage of the separator itself before soaked in the electrolyte solution is measured. Comparative examples 4 to 7 and examples 4 to 7 use the polyethylene film as the porous polymer substrate, and the thermal shrinkage is measured at 130° C. which is lower than the melting point of the polyethylene porous polymer substrate. Accordingly, the thermal shrinkage is calculated as (initial length−length after thermal contraction treatment at 130° C./30 min)/(initial length)×100.

(4) Method for Measuring Thermal Shrinkage of Separator after Soaked in Electrolyte Solution For comparative examples 4 to 7 and examples 4 to 7 using the polyethylene porous polymer substrate having lower heat resistance than polypropylene, the thermal shrinkage of the separator soaked in the electrolyte solution is measured. In this instance, the thermal shrinkage is calculated as (initial length−length after thermal contraction treatment at 150° C./30 min)/(initial length)×100.

Referring to the results of the above Table 1, examples 1 to 3 are the separators having the thermosetting phenol-based resin coated on the polypropylene porous polymer substrate, and when compared with comparative example 1 having no coating layer, the separators may provide equivalent or similar air permeability and low thermal shrinkage.

Comparative example 2 is the separator having the PVDF-based polymer coating layer formed on the polypropylene porous polymer substrate. Comparative example 2 and example 2 use different resins and have the same solids content in the coating solution. It can be seen that the separator of example 2 has the improved air permeability compared to comparative example 2, and exhibits the suppressed thermal shrinkage although the polymer coating amount per 1 m² of the porous substrate is low.

The separators of examples 4 to 7 are ones using polyethylene as the porous polymer substrate. Comparative example 6 and example 6 use different resins and have the same solids content in the coating solution. It can be seen that the separator of example 6 has the improved air permeability compared to comparative example 6, and shows a good thermal shrinkage suppression effect although the polymer coating amount per 1 m² of the porous substrate is low.

Meanwhile, it can be seen that in the case of examples 1 to 3 using polypropylene as the porous polymer substrate, on the basis of comparative example 1, the rise in air permeability is small even though the coating layer is formed. For example, it can be seen that in the case of comparative example 1, air permeability is 119 sec/100 ml, and in the case of example 3, the air permeability value is 276 sec/100 ml and there is an increase by about 56%. It appears that since polypropylene is manufactured by a dry method, the pores in the porous polymer substrate are formed in a straight shape, leading to low tortuosity.

In contrast, in the case of examples 4 to 7 using polyethylene as the porous polymer substrate, the rise in air permeability is higher than that of polypropylene. For example, in the case of comparative example 4, air permeability is 81 sec/100 ml, in the case of example 4, air permeability is 86 sec/100 ml, and in the case of example 7, air permeability is 439 sec/100 ml and there is an increase by about 81%. It appears that this is because polyethylene is manufactured by a wet method. Specifically, since fibrils in the wet separator form a pore structure in complex entangled state, when the binder polymer is wetted, the rise in air permeability is high. However, when compared with comparative examples 2 and 5 having the conventional porous coating layer, examples show a very small rise in air permeability. Additionally, the separators of examples 4 to 7 using the thermosetting phenol-based resin as the component of the polymer coating layer do not have a significant reduction in thermal shrinkage of the separator after soaked in the electrolyte solution, compared to comparative examples 5 and 6 using the PVDF-HFP polymer.

Meanwhile, it can be seen that the separators of comparative examples 3 and 7 comprising the thermosetting phenol-based resin of more than 3 g per 1 m² of the porous polymer substrate exhibit notable degradation in air permeability.

What is claimed is:

1. A separator for a lithium secondary battery, comprising:
   a porous polymer substrate having a plurality of pores; and
   a polymer coating layer on at least one surface of the porous polymer substrate,
   wherein the polymer coating layer comprises a thermosetting phenol-containing resin having at least one hydroxyl group and at least one aromatic ring, and
   a coating amount of the thermosetting phenol-containing resin is 0.01 g/m² to 3 g/m² of the porous polymer substrate based on one polymer coating layer,
   wherein the thermosetting phenol-containing resin is configured to be thermally cured at 120° C. to 200° C. in the separator to form a network structure, and
   wherein the separator does not comprise inorganic particles.

2. The separator for the lithium secondary battery according to claim 1, wherein the thermosetting phenol-containing resin comprises at least one of a novolac-containing phenol resin represented by Formula 1 or a resol-containing phenol resin represented by Formula 2:

[Formula 1]

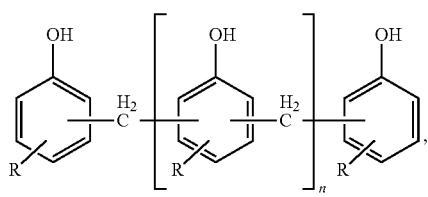

in the Formula 1, n is an integer of 1 or greater, and R is any one of H, alkyl, alkoxy and alkenyl group having 1 to 100 carbon atoms,
wherein the alkyl, alkoxy and alkenyl group having 1 to 100 carbon atoms are optionally substituted,

[Formula 2]

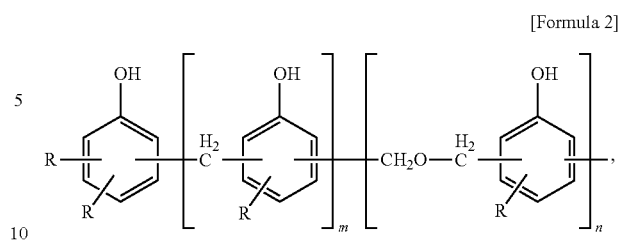

in the Formula 2, each of n and m is an integer of 1 or greater, and R is any one of H, alkyl, alkoxy and alkenyl group having 1 to 100 carbon atoms,
wherein the alkyl, alkoxy and alkenyl group having 1 to 100 carbon atoms are optionally substituted.

3. The separator for the lithium secondary battery according to claim 1, wherein the thermosetting phenol-containing resin is a phenol-formaldehyde resin.

4. The separator for the lithium secondary battery according to claim 1, wherein the coating amount of the thermosetting phenol-containing resin is 0.05 g/m² to 2.5 g/m² of the porous polymer substrate based on one polymer coating layer.

5. The separator for the lithium secondary battery according to claim 1, wherein the coating amount of the thermosetting phenol-containing resin is 0.35 g/m² to 2.1 g/m² of the porous polymer substrate based on one polymer coating layer.

6. The separator for the lithium secondary battery according to claim 1, wherein the porous polymer substrate comprises a porous polymer film comprising at least one of polyethylene or polypropylene.

7. A lithium secondary battery, comprising:
   a positive electrode,
   a negative electrode, and
   a separator interposed between the positive electrode and the negative electrode,
   wherein the separator is defined in claim 1.

8. A method for manufacturing a separator for a lithium secondary battery, comprising:
   (S1) preparing a polymer solution comprising a thermosetting phenol-containing resin having at least one hydroxyl group and at least one aromatic ring is dissolved in a solvent; and
   (S2) coating the polymer solution on at least one surface of a porous polymer substrate, wherein a coating amount of the thermosetting phenol-containing resin is 0.01 g/m² to 3 g/m² of the porous polymer substrate based on one polymer coating layer and drying the coated polymer solution to form a polymer coating layer,
   wherein the thermosetting phenol-containing resin is configured to be thermally cured at 120° C. to 200° C. in the separator to form a network structure, and
   wherein the separator does not comprise inorganic particles.

9. The method for manufacturing the separator for the lithium secondary battery according to claim 8, wherein the thermosetting phenol-containing resin comprises at least one of a novolac-containing phenol resin represented by Formula 1 or a resol-containing phenol resin represented by Formula 2:

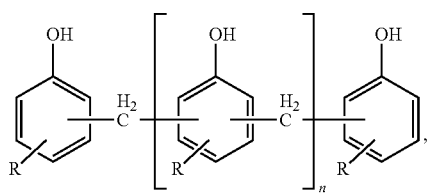

[Formula 1]

in the Formula 1, n is an integer of 1 or greater, and R is any one of H, alkyl, alkoxy and alkenyl group having 1 to 100 carbon atoms, wherein the alkyl, alkoxy and alkenyl group having 1 to 100 carbon atoms are optionally substituted,

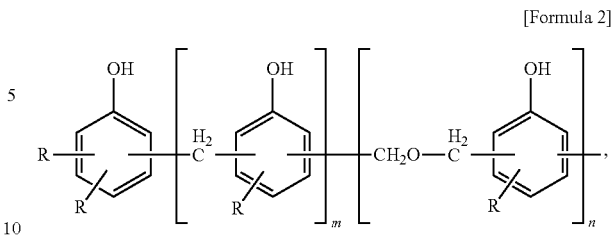

[Formula 2]

in the Formula 2, each of n and m is an integer of 1 or greater, and R is any one of H, alkyl, alkoxy and alkenyl group having 1 to 100 carbon atoms, wherein the alkyl, alkoxy and alkenyl group having 1 to 100 carbon atoms are optionally substituted.

10. The method for manufacturing the separator for a lithium secondary battery according to claim 8, wherein the coating amount of the thermosetting phenol-containing resin is 0.05 g/m$^2$ to 2.5 g/m$^2$ of the porous polymer substrate based on one polymer coating layer.

11. The method for manufacturing the separator for a lithium secondary battery according to claim 8, wherein the coating amount of the thermosetting phenol-containing resin is 0.35 g/m$^2$ to 2.1 g/m$^2$ of the porous polymer substrate based on one polymer coating layer.

* * * * *